United States Patent
Nystrom et al.

(10) Patent No.: US 9,167,415 B2
(45) Date of Patent: Oct. 20, 2015

(54) CLOUD-BASED CONNECTIVITY INFORMATION DISCOVERY

(75) Inventors: Martin W. S. Nystrom, Espoo (FI); Ari J. Salmi, Oulu (FI); Teemu Kotiharju, Helsinki (FI); Karsten Homann, Zell (DE)

(73) Assignee: Nokia Technologies Oy, Espoo (FI)

( * ) Notice: Subject to any disclaimer, the term of this patent is extended or adjusted under 35 U.S.C. 154(b) by 793 days.

(21) Appl. No.: 13/417,482

(22) Filed: Mar. 12, 2012

(65) Prior Publication Data
US 2013/0237200 A1    Sep. 12, 2013

(51) Int. Cl.
*H04M 3/42*   (2006.01)
*H04W 8/20*   (2009.01)
*H04W 8/26*   (2009.01)

(52) U.S. Cl.
CPC .. *H04W 8/20* (2013.01); *H04W 8/26* (2013.01)

(58) Field of Classification Search
CPC .......................... H04L 29/08108; H04Q 3/005
USPC ....................... 455/418, 414.1, 461
See application file for complete search history.

(56) References Cited

U.S. PATENT DOCUMENTS

| | | | |
|---|---|---|---|
| 7,224,960 B2 | 5/2007 | Giacalone et al. | 455/410 |
| 2002/0016857 A1 | 2/2002 | Harari | 709/238 |
| 2011/0294472 A1* | 12/2011 | Bramwell et al. | 455/413 |
| 2012/0164996 A1* | 6/2012 | May et al. | 455/414.1 |
| 2013/0117281 A1 | 5/2013 | Fleet et al. | 707/748 |

FOREIGN PATENT DOCUMENTS

| | | |
|---|---|---|
| EP | 2268090 A2 | 12/2010 |
| WO | WO-99/62282 A1 | 12/1999 |

\* cited by examiner

*Primary Examiner* — Justin Lee
(74) *Attorney, Agent, or Firm* — Harrington & Smith

(57) ABSTRACT

A method includes detecting a change in connectivity information for a mobile device. The connectivity information allows another device to connect to the mobile device at least while the mobile device is wirelessly connected to a network. In response to the change in connectivity information for a mobile device, performing an update with a service provider to indicate the change in connectivity information. Another method includes receiving an update from a first electronic device, where the update indicates one or more changes in connectivity information for the first electronic device. The method includes updating one or more second electronic devices with changed connectivity information of the first electronic device. Another method includes receiving from a service provider an update of changed connectivity information for a first electronic device for which a second electronic device is subscribed at the service provider for updates to connectivity information for the first electronic device.

7 Claims, 11 Drawing Sheets

CLOUD-BASED CONNECTIVITY INFORMATION DISCOVERY

TECHNICAL FIELD

This invention relates generally to wireless communications and, more specifically, relates to mobile devices able to use multiple SIM (subscriber identity module) cards, devices changing IP addresses, and devices having other connectivity information.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A subscriber identity module (SIM) is an integrated circuit that securely stores information to authenticate subscribers for carriers on mobile, wireless devices (such as mobile phones and computers). Such information can include, e.g., the International Mobile Subscriber Identity (IMSI).

Many mobile devices allow multiple SIM cards to be used. Such SIM cards could be, e.g., prepaid, pay as you use, or associated with a contract with an operator. Typically, each SIM card is associated with a single operator. This means for mobile devices allowing use of multiple SIM cards, for switching between SIM cards, operators are also switched. Switching operators entails a corresponding switch in phone numbers and IP (internet protocol) addresses for the mobile device, and may entail switching other connectivity information such as email addresses.

Because a switch in operators causes a corresponding switch in phone numbers to a new phone number, anyone trying to call the original phone number (before the switch in SIM cards) will not reach the new phone number, as the SIM card corresponding to that old phone number is no longer in use. Similarly, anyone trying to reach the mobile device using the original IP address of the mobile device (before the switch in SIM cards) will not be able to reach the mobile device, as the original IP address is no longer valid for the mobile device. Thus, certain P2P (peer-to-peer) applications will no longer function correctly.

It is also possible, for instance in the case of a software (SW) SIM or embedded SIM, that the SIM can allow for multiple operators to be served with the same SIM. That is, multiple IMSIs and perhaps corresponding phonebook numbers can be held in the same SIM. However, this does not change the problems described above, as anyone trying to reach a new phone number or mobile IP address caused by a change in operator for a single SIM allowing multiple operators to be selected still will not be able to reach the new phone number or IP address.

Thus, while allowing users to use multiple SIMs has benefits, switching between SIMs causes the problem that the users who switch between SIMs are no longer reliably reachable. This problem exists for every user using multiple SIM cards: How does one reliably reach someone who uses multiple SIMs?

SUMMARY

The examples in this section are merely illustrative and should not be construed as being limiting.

In an exemplary embodiment, a method is disclosed that includes the following: detecting a change in connectivity information for a mobile device, the connectivity information allowing another device to connect to the mobile device at least while the mobile device is wirelessly connected to a network; and in response to the change in connectivity information for a mobile device, performing an update with a service provider to indicate the change in connectivity information.

An apparatus is disclosed that includes means for detecting a change in connectivity information for a mobile device, the connectivity information allowing another device to connect to the mobile device at least while the mobile device is wirelessly connected to a network; and means, in response to the change in connectivity information for a mobile device, for performing an update with a service provider to indicate the change in connectivity information.

In a further exemplary embodiment, a computer program product is disclosed that includes a computer-readable storage medium bearing computer program code embodied therein for use with a computer. The computer program code includes the following: code for detecting a change in connectivity information for a mobile device, the connectivity information allowing another device to connect to the mobile device at least while the mobile device is wirelessly connected to a network; and code for, in response to the change in connectivity information for a mobile device, performing an update with a service provider to indicate the change in connectivity information.

In an additional exemplary embodiment, an apparatus is disclosed that includes one or more processors and one or more memories including computer program code. The one or more memories and the computer program code are configured, with the one or more processors, to cause the apparatus to perform at least the following: detecting a change in connectivity information for a mobile device, the connectivity information allowing another device to connect to the mobile device at least while the mobile device is wirelessly connected to a network; and in response to the change in connectivity information for a mobile device, performing an update with a service provider to indicate the change in connectivity information.

In another exemplary embodiment, a method is disclosed that includes the following: receiving an update from a first electronic device, where the update indicates one or more changes in connectivity information for the first electronic device, the connectivity information allowing second electronic devices to connect to the first electronic device at least while the first electronic device is wirelessly connected to a network; and updating one or more second electronic devices with changed connectivity information of the first electronic device.

In a further exemplary embodiment, an apparatus is disclosed that includes means for r receiving an update from a first electronic device, where the update indicates one or more changes in connectivity information for the first electronic device, the connectivity information allowing second electronic devices to connect to the first electronic device at least while the first electronic device is wirelessly connected to a network; and means for updating one or more second electronic devices with changed connectivity information of the first electronic device.

An additional exemplary embodiment is a computer program product including a computer-readable storage medium bearing computer program code embodied therein for use with a computer. The computer program code includes the following: code for receiving an update from a first electronic device, where the update indicates one or more changes in connectivity information for the first electronic device, the connectivity information allowing second electronic devices to connect to the first electronic device at least while the first electronic device is wirelessly connected to a network; and code for updating one or more second electronic devices with changed connectivity information of the first electronic device.

An exemplary apparatus includes one or more processors and one or more memories including computer program code. The one or more memories and the computer program code are configured, with the one or more processors, to cause the apparatus to perform at least the following: receiving an update from a first electronic device, where the update indicates one or more changes in connectivity information for the first electronic device, the connectivity information allowing second electronic devices to connect to the first electronic device at least while the first electronic device is wirelessly connected to a network; and updating one or more second electronic devices with changed connectivity information of the first electronic device.

In an additional exemplary embodiment, a method includes: receiving from a service provider an update of changed connectivity information for a first electronic device for which a second electronic device is subscribed at the service provider for updates to connectivity information for the first electronic device, the receiving occurring at the second electronic device, the connectivity information allowing second electronic devices to connect to the first electronic device at least while the first electronic device is wirelessly connected to a network; and attempting, at the second electronic device, to contact the first electronic device using at least some of the changed connectivity information.

In another exemplary embodiment, an apparatus is disclosed that includes means for receiving from a service provider an update of changed connectivity information for a first electronic device for which a second electronic device is subscribed at the service provider for updates to connectivity information for the first electronic device, the receiving occurring at the second electronic device, the connectivity information allowing second electronic devices to connect to the first electronic device at least while the first electronic device is wirelessly connected to a network; and means for attempting, at the second electronic device, to contact the first electronic device using at least some of the changed connectivity information.

A further exemplary embodiment includes a computer program product including a computer-readable storage medium bearing computer program code embodied therein for use with a computer. The computer program code includes: code for receiving from a service provider an update of changed connectivity information for a first electronic device for which a second electronic device is subscribed at the service provider for updates to connectivity information for the first electronic device, the receiving occurring at the second electronic device, the connectivity information allowing second electronic devices to connect to the first electronic device at least while the first electronic device is wirelessly connected to a network; and code for attempting, at the second electronic device, to contact the first electronic device using at least some of the changed connectivity information.

Another exemplary embodiment is an apparatus including one or more processors and one or more memories including computer program code. The one or more memories and the computer program code are configured, with the one or more processors, to cause the apparatus to perform at least the following: receiving from a service provider an update of changed connectivity information for a first electronic device for which a second electronic device is subscribed at the service provider for updates to connectivity information for the first electronic device, the receiving occurring at the second electronic device, the connectivity information allowing second electronic devices to connect to the first electronic device at least while the first electronic device is wirelessly connected to a network; and attempting, at the second electronic device, to contact the first electronic device using at least some of the changed connectivity information.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
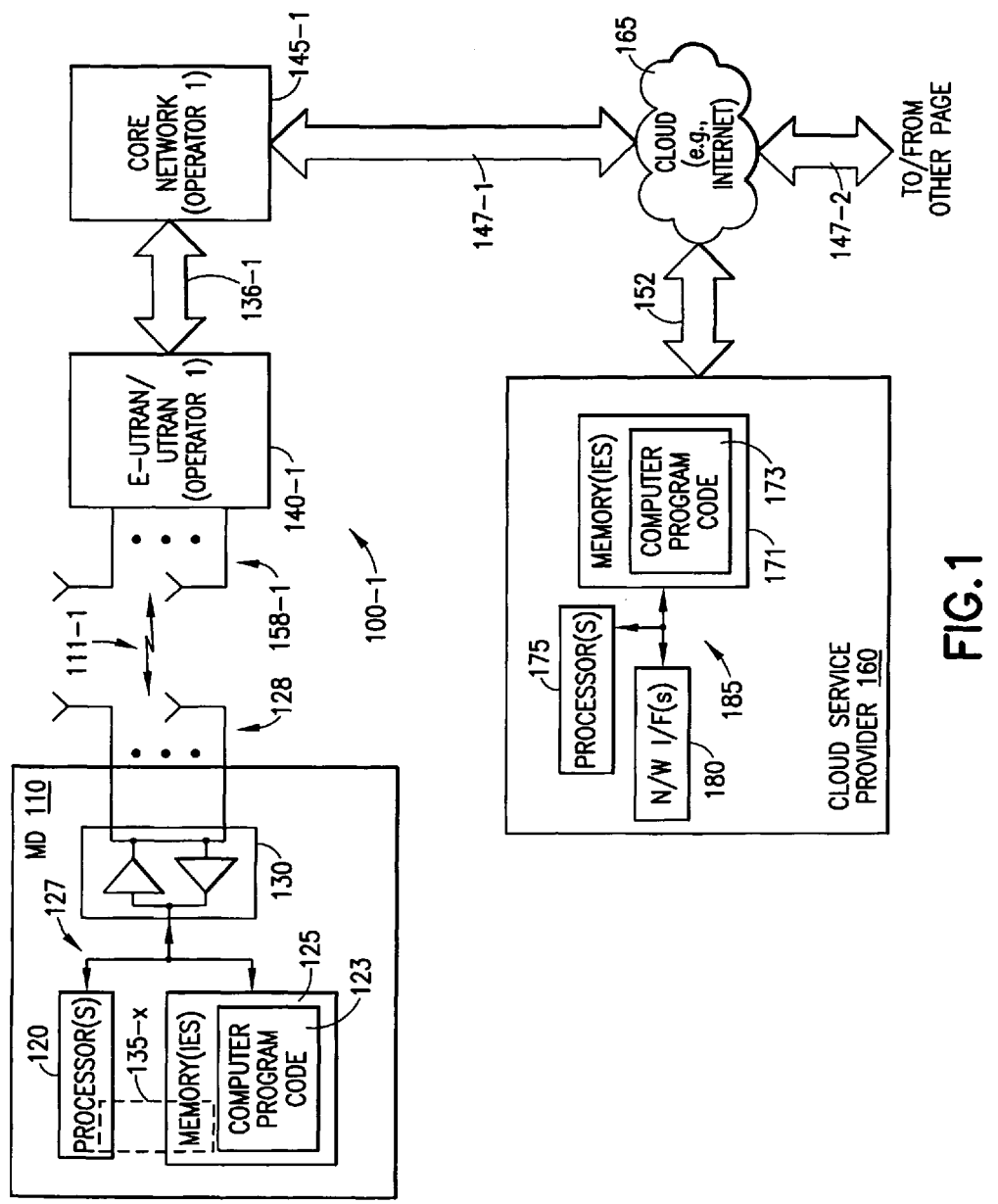
FIG. 1 is a block diagram of an exemplary system in which the exemplary embodiments may be practiced.
Figure 1B:
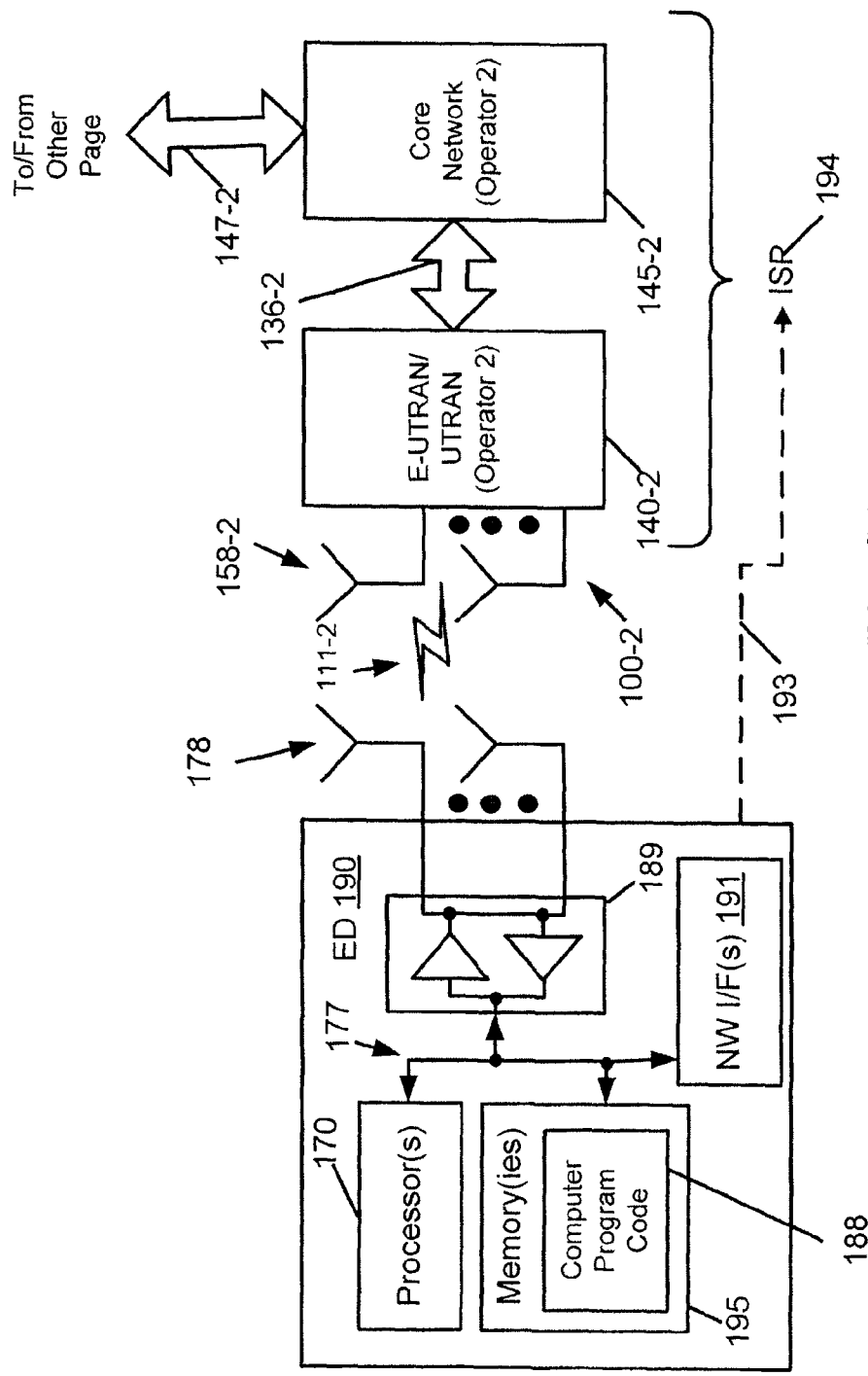
FIG. 1(b) is a continuation of the block diagram shown in FIG. 1.

Before proceeding with additional descriptions of problems contacting mobile devices used by friends, reference is made to FIG. 1 and FIG. 1(b), which shows a block diagram of an exemplary system in which the exemplary embodiments may be practiced. In this example, the electronic device (ED) 190 would benefit from being able to contact the MD (mobile device) 110. Users of both devices have a relationship with the cloud service provider 160, which may be a social networking provider. In FIG. 1, a MD (mobile device) 110 is in wireless communication with a network 100-1 via a corresponding wireless link 111-1. The user equipment 110 includes one or more processors 120, one or more memories 125, and one or more transceivers 130 interconnected through one or more "buses" 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein. Also shown in this example is a SIM card 135-x, which is illustrated as having both a memory 125 and a processor 120. Additional description concerning the SIM card 135-*x* is presented below.

The UE 110 communicates with an E-UTRAN (evolved-UTRAN) or UTRAN (universal terrestrial radio access network) 140-1 via link 111-1 and via one or more antennas 158-1. The E-UTRAN/UTRAN 140-1 connects to a core network 145-1 through a link 136-1. Both the E-UTRAN/UTRAN and the core network 145-1 are operated by Operator 1 in this example.

The core network 145-1 connects to the cloud 165, which is a network typically including the Internet. Also connected to (or part of) the cloud 165 is the cloud service provider 160, interconnected with the cloud 165 via link 152. The cloud service provider 160 includes one or more processors 175, one or more memories 171, and one or more network interfaces (N/W I/F(s)) 180, all interconnected through one or more "buses" 185. The term "buses" herein is to be interpreted broadly, to include hardwired, wireless, optical, and other communication mechanisms, including networks. The processors 175, memories 171, and network interfaces 180 may be distributed (e.g., across multiple computers). The one or more memories 171 include computer program code 173. The one or more memories 171 and the computer program code 173 are configured to, with the one or more processors 175, cause the cloud service provider 160 to perform one or more of the operations as described herein. The one or more network interfaces 180 allow the cloud service provider 160 to communicate with and through the cloud 165 to the MD 110 and the ED 190.

Figure 2:
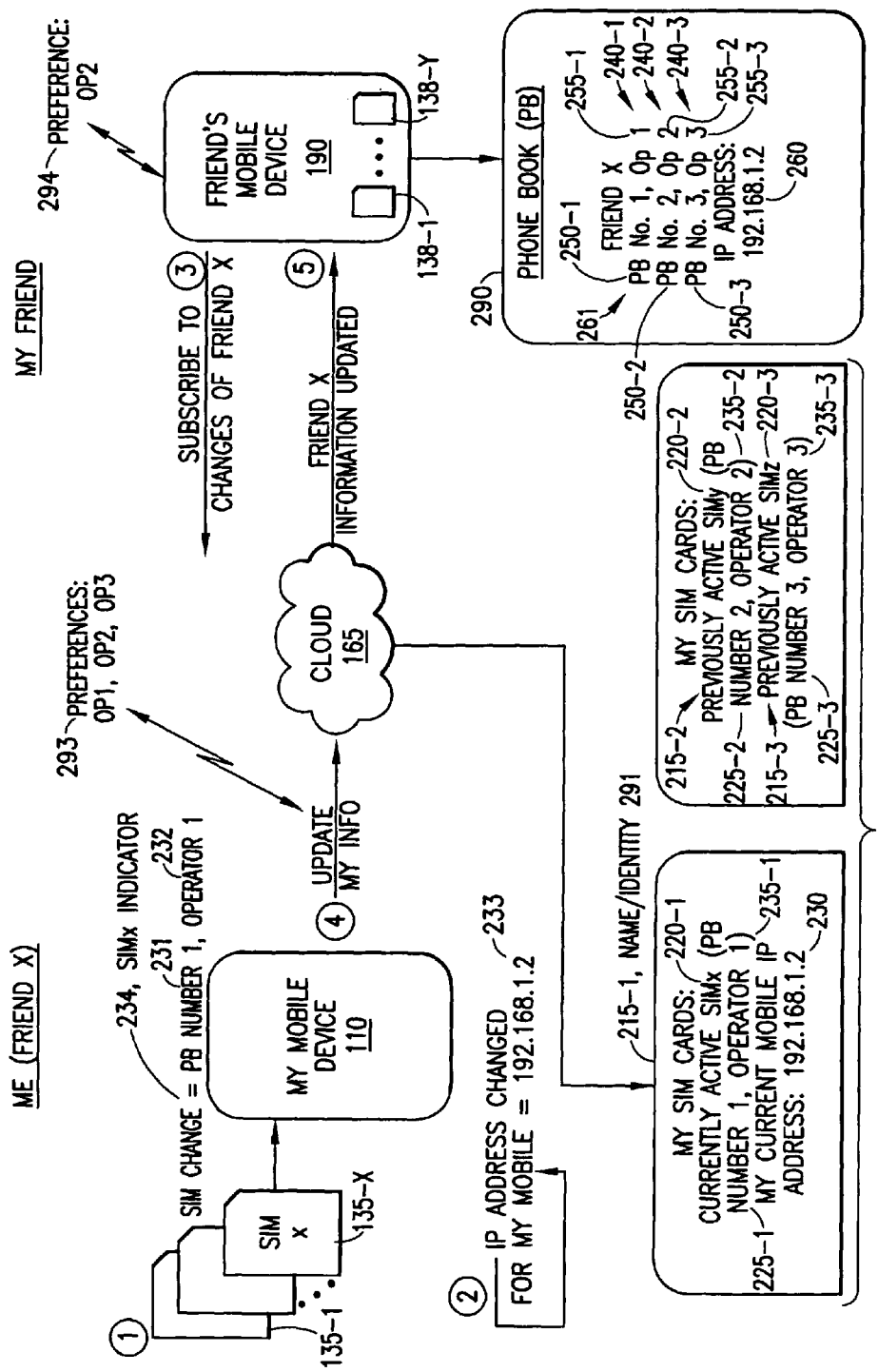
FIG. 2 is a block diagram illustrating activities to initiate updating of connectivity information.

The ED 190 comprises one or more processors 170, one or more memories 195, one or more transceivers 189, and one or more network interfaces (N/W I/F(s)) 191, all interconnected through one or more "buses" 177. As above, the term buses should be broadly construed. The one or more memories 195 include computer program code 188. The one or more memories 195 and the computer program code 188 are configured to, with the one or more processors 170, cause the ED 190 to perform one or more of the operations as described herein. The electronic device 190 may also comprise one or more SIM cards. The example of FIG. 2 shows SIM cards 138-1 through 138-*y* being available.

In one embodiment, the ED 190 includes antenna(s) 178 that are used to communicate over wireless link 111-2 with the network 100-2, including an E-UTRAN/UTRAN 140-2 (with antenna(s) 158-2), link 136-2, and core network 145-2, all of which are operated in this example by Operator 2. The core network 145-2 communicates with the cloud 165 using the link 147-2 and communicates with the E-UTRAN/UTRAN 140-2 using the link 136-2. In another embodiment, the ED 190 can communicate using a wired connection 193, e.g., an Internet connection, to an Internet service provider (ISP) 194 that is connected to the cloud 165 via the link 147-2.

The illustration of the electronic device 190 being connected to Operator 2 while the mobile device 110 is connected to Operator 1 is merely one example. Both electronic device 190 and mobile device 110 may be connected to the same operator. In terms of the cloud service provider 160, the example used herein mainly relates to electronic systems operating a social networking service. However, the cloud service provider 160 may be thought of as a SIM operator, and can be any suitable electronic system as long as phone number information is known and can be given or configured to be known in, e.g., a social networking service.

The computer readable memories 125, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 171, and 195 may implement a computer readable storage medium, as part of a program product, and may be used to contain code for performing operations. The processors 120, 175, and 170 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the mobile device 110 may include, but are not limited to, smart phones, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The ED 190 may also include all of these embodiments, but may also include wired-only or a combination of wired and wireless embodiments.

Returning now to additional descriptions of problems contacting mobile devices used by friends, if the user of the mobile device 110 changes the SIM card from SIM card 135-1 (not shown in FIG. 1 but shown in FIG. 2) to SIM card 135-*x*, this changes the operator for the mobile device 110, the phone number for the mobile device 110, and likely will change the IP (Internet protocol) address. Without direct contact from the user of mobile device 110 to electronic device 190, the user using electronic device 190 can no longer contact the mobile device 110 using the previously valid phone number and mobile IP address for the mobile device 110.

This problem is not widely technically solved yet. For example, in India people are sending SMSs (short message service messages) to friends that they changed their SIM cards for cheaper calls. In some cases, there are call forwarding from multi-SIM cards by the operators, but when people are using prepaid or multiple operator SIM cards, call forwarding by an operator does not work. Also, informing a current active IP address to others is not globally solved.

Exemplary embodiments of the instant invention solve the problem of discovering the right phone number a friend is using at the moment another friend creates a call. This may be performed by receiving automatic updates of changes to phone numbers or querying the up-to-date information from the cloud service provider 160. Also, this innovation solves the problem of discovering the IP address for a mobile device. Furthermore, the innovation may be used for any connectivity information of a mobile device 110, where connectivity information is any information allowing another user to connect to the mobile device 110, at least when the mobile device 110 is operating wirelessly. Another possible example of connectivity information is email addresses, which may change if these addresses are provided by the provider of the wireless service.

Turning to FIG. 2, this figure is a block diagram illustrating activities to initiate updating of connectivity information. In this example, the user of mobile device 110 has the option to select one of the SIM cards 135-1 through 135-*x*. The user may change the SIM card 135, e.g., by physically replacing one SIM card 135 with another SIM card 135, or by using software (e.g., as part of computer program code 123) for switching between SIM cards 135 on multiple SIM devices. In the examples that follow, changing the SIM card 135 is assumed to change the phonebook (pb) number and the IP address for the mobile device 190, however, this need not be the case.

In the example of FIG. 2, the user of mobile device 110 is "Me (friend X)" and the user of mobile device 190 is "My Friend". The user of the mobile device 110 changes (shown as operation 1) the SIM card to SIM card x (SIMx) 135-x. This causes a change from an original phone number (e.g., 225-2 or 225-3) to a current phone number 231, operated by Operator 1 (indicated by indication 232). The IP address also changes (operation 2) to 192.168.1.2 (IP address 233). It is noted the mobile device 110 may receive a new IP address due to the SIM change or for other reasons, such as the user getting back to a network after being offline.

The user of mobile device 190 subscribes (operation 3) to the changes to connectivity information of "friend x" using the cloud 165 (and cloud service provider 160). The mobile device 110 updates (operation 4) the connectivity information for the mobile device 110 to the cloud 165 (and to the cloud service provider 160). The updating occurs responsive to the change in SIM card 135 or to a change in the IP address 233 (or both). In this example, the mobile device 110 updates using the SIMx indicator 234, the phonebook (pb or PB) number 231, indication 232 of Operator 1, and IP address 233. Although each SIM 135 has a corresponding unique SIM indicator 234, a clever user interface (e.g., executed by one or more processors 120) is typically needed to determine the correct phone number for the phone as getting phone number from the SIM card 135 is not guaranteed as implementation of physical SIMs can be different and not all are implemented by the SIM specification with all features of the specification.

The cloud service provider 160 (in the cloud 165 or connected thereto) then updates a database 217 (stored in memories 171) including entry 215-1, which is updated to include the SIMx indicator 220-1, the phonebook number 1 (225-1), an indication 235-1 of the Operator 1, which correspond to the updated SIMx indicator 234, the phonebook number 231, indication 232 of Operator 1, respectively. The entry 215-1 further includes the current mobile IP address 230, which corresponds to the updated IP address 233. In one embodiment, only the currently active data is stored. Furthermore, not all of this data need be stored in the database 217. For instance, the phonebook number 225-1 may be stored as a minimum, or the mobile IP address 230-1 stored as a minimum, or both the phonebook number 225-1 and the mobile IP address 230-1 stored as a minimum. Storing SIM indicators 220 can be important in some implementations, because, as stated above, the phone number is not always guaranteed to be able to be retrieved from or using the SIM, but other identifiers are able to be retrieved. That way, the list of SIMs that the user has is able to be sent into a social network cloud (e.g., cloud 165). The user of the mobile device 110 may update (operation 4 in FIG. 2) the SIM phone number in the social network (e.g., operated by cloud service provider 160) with a browser or the user interface (UI) in the mobile device 110 may perform the update (operation 4 in FIG. 2).

Pass through of information can be used if the originator can send the mobile phone number at the same time. That is, as stated above, the phone number is not always guaranteed to be able to be retrieved from the SIM 135, but other identifiers are able to be retrieved. That way, the system can create the list of SIMs that a user has by placing the SIMs into the social network cloud (e.g., cloud 165) and either update SIM phone number in the social network with a browser (e.g., executed by the one or more processors 120) or the user interface (also executed by the one more processors 120) in the mobile can be programmed to do so.

Pass through of information can be used if the originator (e.g., the user using mobile device 110) can send the mobile phone number at the same time. That is, the cloud service provider may not need, in some implementations, to store the information but instead can simply "pass through" the update (operation 4 in FIG. 2) to the electronic devices 190. However, pass through may be less beneficial than storage (e.g., and subsequent access by electronic devices 190), as users of the electronic devices 190 may not be logged into the service (and therefore not receive an update) or may not have their device turned on or accessible when the update (operation 5 in FIG. 2) is to be performed. In order to distinguish users, the database entries 215 may be associated with a name and/or identity 291 of the user.

In another example, previously active phonebook numbers and operators are also stored, as shown in entries 215-2 and 215-3. Entry 215-2 stores previously active SIMy indicator 220-2, corresponding to phonebook number 2 (225-2) and indication 235-2 of the Operator 2. Similarly, entry 215-3 stores previously active SIMz indicator 220-3, corresponding to phonebook number 3 (225-3) and indication 235-3 of the Operator 3. This example might be used if the user of mobile device 110 has multiple SIM cards 135, which would allow simpler updating. For instance, the mobile device 110 could simply send the indication 234 of the SIM card (assuming this SIM card has been used), and the cloud service provider 160 would therefore select the appropriate active connectivity information based thereon.

Responsive to receiving the update (operation 4), the cloud service provider 160 then sends updates (operation 5) to all of the "friends" of the user of mobile device 110. In the example of FIG. 2, the mobile device 190 receives the update indicating that Friend X has had connectivity information updated. The mobile device 190 stores the updated information in the phonebook 290. In one example, only the active information is stored, and the mobile device 190 selects or populates the entry 240-1 with the phonebook (PB) number (No.) 1 250-1 (corresponding to phonebook number 225-1) and may also receive and store the corresponding indication 255-1 of Operator 1 (corresponding to indication 235-1), and also populates the phonebook 290 with the active mobile IP address 260 (corresponding to mobile IP address 230). One reason the operator information might be useful is if the user of the mobile device 190 also uses that operator and there are cheaper person-to-person calls or data transfers from that operator when both devices 110/190 use that operator. That is, the user of the mobile device 190 could change SIM cards in the mobile device 190 in order to connect to the mobile device 110 using the same operator as used by the mobile device 110.

In an additional exemplary embodiment, the mobile device 190 stores additional entries 240-2 and 240-3 for previously active phonebook numbers 250-2, 250-3 (respectively) and corresponding indications 255-2, 255-3 of Operators 2, 3 (respectively). Again, this embodiment could be used to select a currently active entry 240, as indicated by the indicator 261.

In a further exemplary embodiment, the update in operation 4 may include preference(s) 293, which in this example are Operator 1 (OP 1), Operator 1 (OP 2), and Operator 3 (OP 3), in order from most preferred (OP 1) to least preferred (OP 3). The mobile device 190 may also have a preference 294 of a preferred operator (OP 2). These preferences may adjust the order and possibly override the order in which connectivity information such as phone numbers are used by the mobile device 190 when the mobile device 190 attempts to contact the mobile device 110. This is explained in more detail below in reference to FIG. 10.

It should be noted that only a single mobile IP address 233/230/260 is active at a time and no previously active mobile IP addresses are kept. This is because mobile IP addresses are assumed to be dynamic and it is assumed even if the same operator assigns, at different times, two mobile IP addresses to the mobile device 110, it is likely the two mobile IP addresses will be different. However, if the mobile device 110 can have the same mobile IP address assigned by the same operator, then multiple previously active mobile IP addresses could be stored, e.g., in entries 215-2, 215-3, 240-2, and 240-3.

Thus, for users of mobile devices 110 who have multiple SIM cards (e.g., prepaid cards), and where the users are either physically changing or switching with software their currently active SIM cards, corresponding connectivity information is updated to the cloud, where in an example names (291) of the users and SIM card information with, e.g., phonebook numbers are stored. At the same time, my friend, who is registered to changes happening in the cloud for the user, gets updates of the currently active phonebook number of the mobile device 110. This way, friend X does not miss any calls (or other communications), from his or her friends, as the mobile devices 190 of the friends know automatically which phonebook number (e.g., or mobile IP address) can be used to reach the user at the time a call (or other communication) is initiated.

It is noted that this system could operate so that if the user of mobile device 110 is at work the user could use the mobile device 110 to update the status of the user to "at work", and the mobile device could update the cloud 165 with the work phone number of the user (and then friends trying to call the user would use the work phone number). In this embodiment, SIM indicator 220 might not be used for the work phone number (or associated with the SIM indicator 220 are phone book numbers for both the mobile device 110 and the work phone, and the user of the electronic device 190 could be given the option to call either the phone number of the mobile device 110 or the work phone number. Some embodiments have a "phonebook-less" (e.g., on the electronic device 190) version, where mobile device 190 sends a message to the cloud to indicate that the mobile device 190 would like to call mobile device 110, and the cloud 165 (e.g., cloud service provider 160) then returns the appropriate phone number 225 and/or mobile IP address 230 to the electronic device 190. For instance, software that allows a user to make voice calls over the Internet can be used to query the cloud service provider 160 and download the current mobile IP address 230 in order to connect the electronic device 190 and the mobile device 110.

Figure 3:
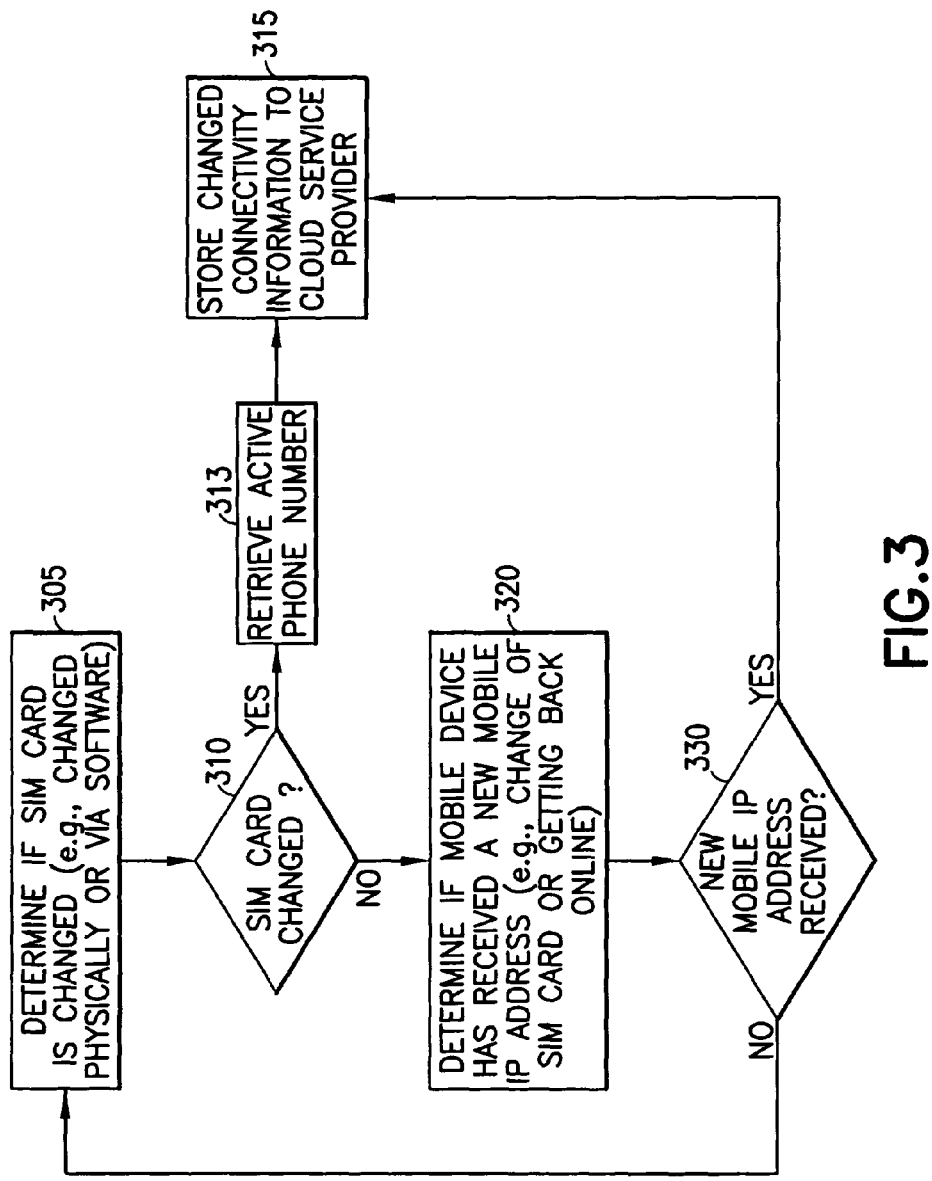
FIG. 3 is a block diagram of a flowchart performed by a mobile device to update connectivity information.

Turning now to FIG. 3, a block diagram is shown of a flowchart performed by a mobile device to update connectivity information. The blocks in the flowchart may be method operations, operations performed by computer program code (and executed by one or more processors 120), operations performed in hardware (e.g., an integrated circuit configured to perform the operations), or operations performed by code in a storage medium (and suitable for causing a computer to perform the operations). In block 305, the mobile device 110 determines if the SIM card has been changed (e.g., via physical replacement or via software). For software, the software itself can determine the SIM card 135 has been changed. For physical replacement, a software program (as part of computer program code 123 and executed by the processor(s) 120) can record SIM-specific information and determine on each startup of the mobile device 110 whether the SIM-specific information has changed. Furthermore, as described above, a change in SIM may be made when a SIM (e.g., a software or embedded SIM) allows a single one of multiple operators to be selected by a user and the user switches from a current operator to a new operator by selecting (e.g., via software) the new operator, which therefore cause a switch in connectivity information.

If the SIM card 135 has changed (block 310=Yes), then the active phone number (corresponding to the SIM card 135 and Operator 1) is retrieved in block 313. There are a number of options to retrieve the active phone number: a) the mobile device 110 retrieves the information from the SIM (e.g., so the SIM or mobile device implements an application programmer interface to allow the user to retrieve the phone number) or b) the user interface in the mobile device 110 has information associated with SIM already stored about the phone number (e.g., queried from user) or c) a SIM identifier, operator and phone number are pre-stored to the cloud service provider 160 and by sending the active SIM identifier to the cloud service provider 160, the mobile device 110 can determine the new number (e.g., by downloading the new phone number from the cloud service provider 160. In block 315, the mobile device 110 stores the changed connectivity information to the cloud service provider 160. If the SIM card has not been changed (block 310=No), in block 320, the mobile device 110 determines if the mobile device has received a new mobile IP address. The change in mobile IP address could be caused by the change in SIM card 135 and subsequent connection to the new operator, which supplies the new mobile IP address, or if the mobile device 110 is getting back online after being offline. If a new IP address has been received (block 330=Yes), then the mobile device stores the changed connectivity information to the cloud service provider 160 in block 315. In block 330, for instance, there could be an application (e.g., as part of computer program code 123) that is online waiting for P2P (person-to-person) contact, and there is indication from lower level software that context has been changed and in this manner, the new IP address can be queried and informed to social networks (e.g., cloud service provider 160). If a new mobile IP address has not been received (block 330=NO), the flowchart continues in block 305.

It is noted that FIG. 3 is written so that there are independent tests of SIM card changes or mobile IP address changes. However, these could easily be combined so that only one update is performed for a SIM card change that also causes a mobile IP address change. Furthermore, blocks 305 and 320 are techniques for detecting a change in connectivity information for the mobile device 110, and are merely exemplary. Changes in other connectivity information may also be detected. Such connectivity information may include, email addresses, location information, network/cellular coverage (e.g., this could provide a good indication of the quality of the possible call), or even information around the user—available WLAN (wireless local area networks, Bluetooth ability at the location, and the like. It should be noted that the operator for the mobile device 110 may also be considered connectivity information, and a change in the operator may also be determined and stored to the cloud service provider 160.

Figure 4:
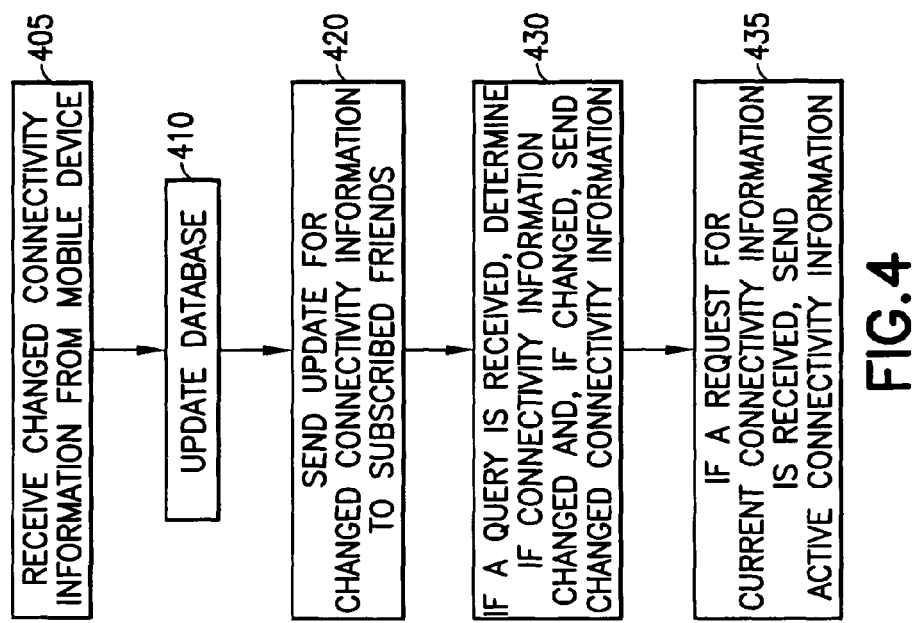
FIG. 4 is a block diagram of a flowchart performed by a cloud service provider to receive, store, and distribute updated connectivity information.

Turning now to FIG. 4, a block diagram is shown of a flowchart performed by a cloud service provider to receive, store, and distribute updated connectivity information. The blocks in the flowchart may be method operations, operations performed by computer program code (and executed by one or more processors), operations performed in hardware (e.g., an integrated circuit configured to perform the operations), or operations performed by code in a storage medium (and suitable for causing a computer to perform the operations).

In block 405, the cloud service provider 160 receives the changed connectivity information from the mobile device 110. In block 410, the cloud service provider 160 updates the database 217 accordingly. In block 420, the cloud service provider 160 sends updates for the changed connectivity information to any subscribed friends. Updates can be sent and received, e.g., through notification APIs (application programmer interfaces). FACEBOOK (a social utility that connects people with friends and others who work, study and live around them) is one example of social network channel which may use a notification API. Block 430 is described in reference to FIG. 6, and block 435 is described in reference to FIG. 7.

Figure 5:
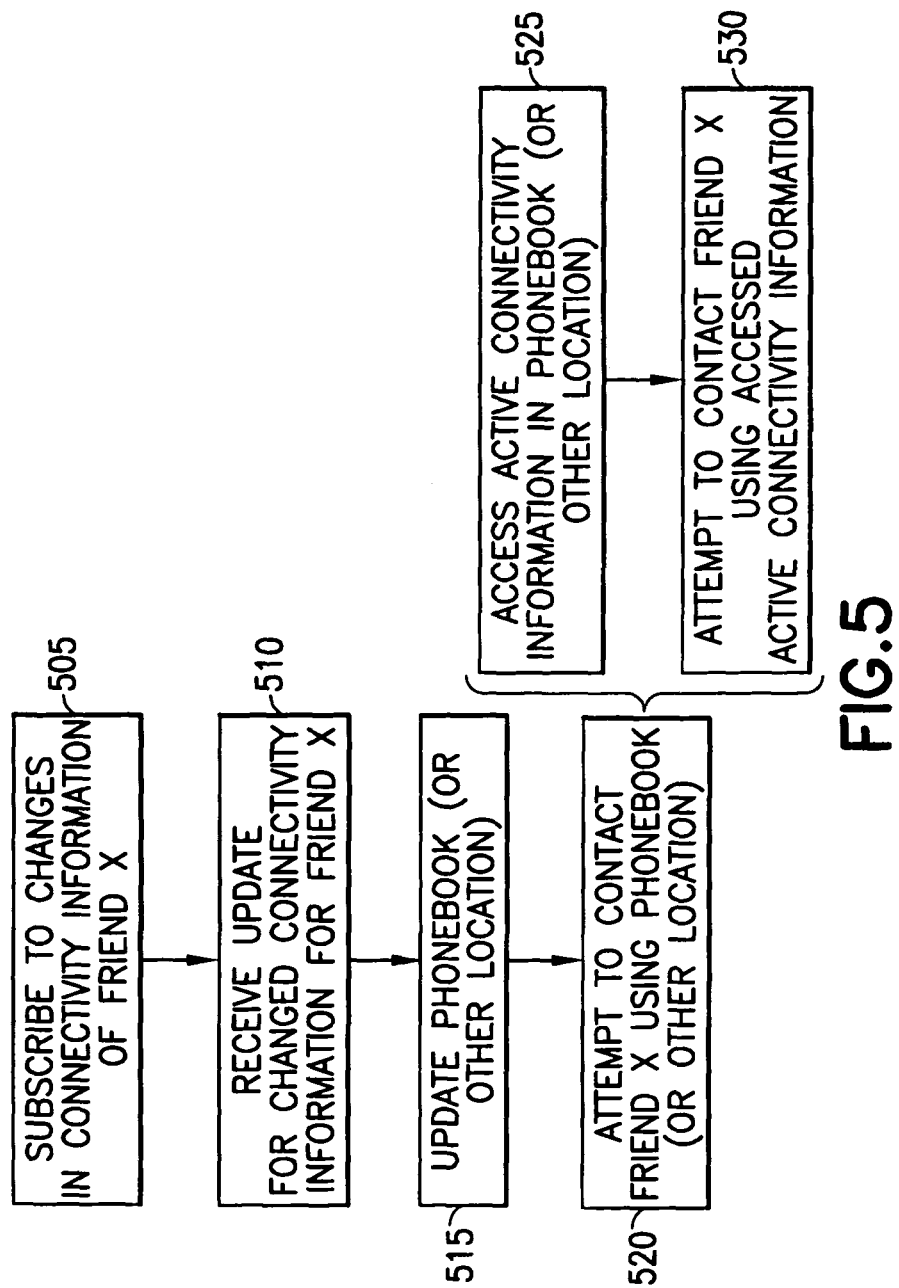
FIG. 5 is a block diagram of a flowchart performed by a device to subscribe to changes in a friend's connectivity information and to use updated connectivity information.

FIG. 5 is a block diagram of a flowchart performed by a device to subscribe to changes in a friend's connectivity information and to use updated connectivity information. The blocks in the flowchart may be method operations, operations performed by computer program code (and executed by one or more processors), operations performed in hardware (e.g., an integrated circuit configured to perform the operations), or operations performed by code in a storage medium (and suitable for causing a computer to perform the operations). In block 505, the electronic device 190 subscribes with the cloud service provider 160 to changes in connectivity information of friend X. Subscribing to a friend's notification on changes in social networking status, updates and in the instant case for information of how to connect to the friend, is a mutual agreement. An example of this is as follows, but this is exemplary and not limiting. 1) First, two friends need to agreed together as being as friends in the same social network cloud. Then 2) both friends can agree to give and get communication availability information. This agreement "button" can be either integrated into a mobile device, which then uses an API provided by a social network for the updating agreement, and/or into a web interface of the social network. It is noted that block 505 may be performed responsive to a user of the electronic device 190 interacting with the cloud service provider 160, e.g., via a website with a "subscribe to connectivity information updates of Friend X" function.

In block 510, the electronic device 190 receives an update for changed connectivity information for friend X. The update could indicate a new phonebook number 250, new operator via operator indication 255, and/or a new mobile IP address 260 for mobile device 110. In block 515, the electronic device 190 updates the phonebook 290 or other location. In block 520, the electronic device 190 attempts to contact friend X (i.e., the mobile device 110) using the phonebook 290 (or other location, depending on where the connectivity information is stored).

In one example, block 520 is performed by accessing (block 525) the active connectivity information in the phonebook or the other location. The indicator 261 (or any other technique) may be used to mark connectivity information such as the phonebook number 250-1 as active. In another example, only the active phonebook number 250 and/or mobile IP address 260 or any other connectivity information is kept in the phonebook 290. In block 530, the electronic device 190 attempts to contact the friend X using the accessed active connectivity information, e.g., by connecting to the mobile device 110 using the phonebook number 250-1 or the mobile IP address 260. Blocks 525 and 530 are based on the assumption that the active connectivity information is the correct connectivity information. Meanwhile, FIGS. 6 and 7 provide additional checks to determine if there is updated connectivity information.

Figure 6:
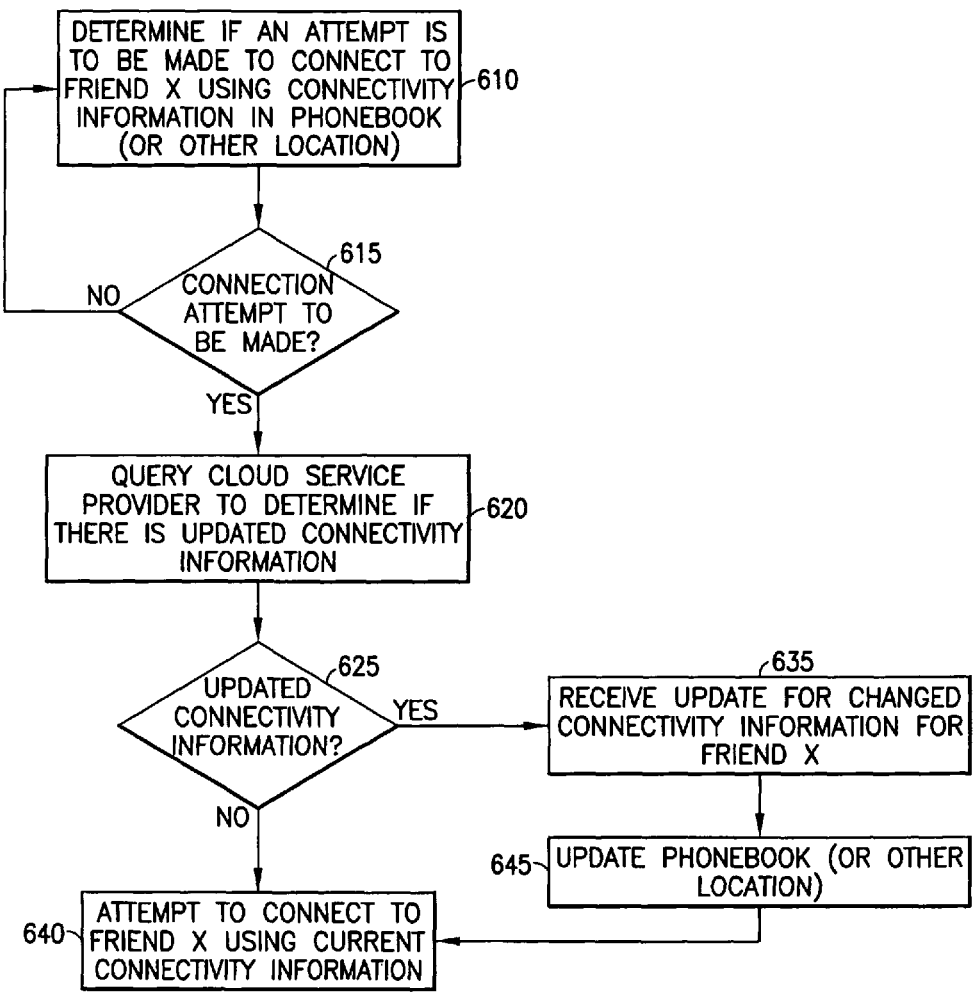
FIGS. 6 and 7 are block diagrams of flowcharts to attempt to contact a friend by accessing a cloud service provider for updated connectivity information of the friend.
Figure 7:
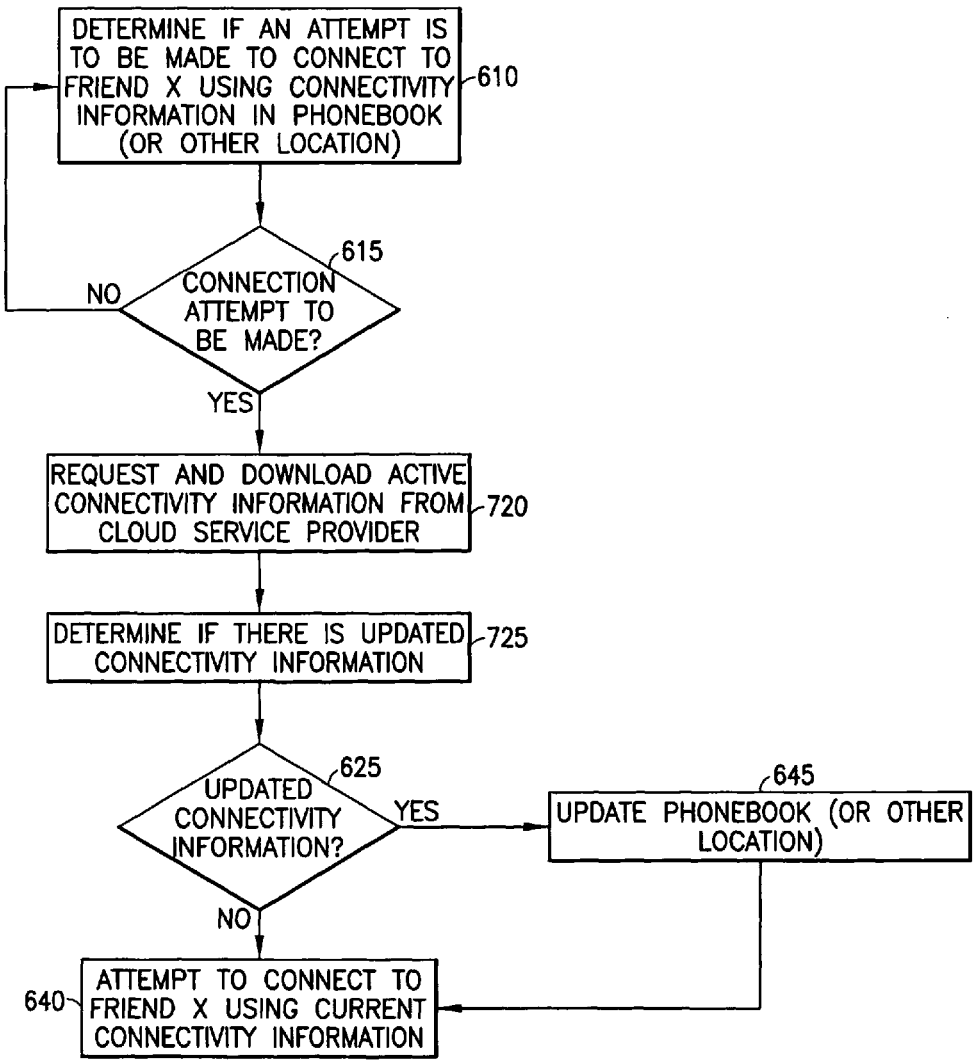

FIGS. 6 and 7 are block diagrams of flowcharts to attempt to contact a friend by accessing a cloud service provider for updated connectivity information of the friend. The blocks in the flowcharts may be method operations, operations performed by computer program code (and executed by one or more processors), operations performed in hardware (e.g., an integrated circuit configured to perform the operations), or operations performed by code in a storage medium (and suitable for causing a computer to perform the operations). FIG. 6 relates to an example where there can be a determination whether active connectivity information has been updated, and subsequent downloading if the connectivity information has been updated. FIG. 7 relates to an example where the active connectivity information is simply downloaded.

Referring to FIG. 6, the electronic device 190 in block 610 determines if an attempt is to be made to connect to friend X using connectivity information in the phonebook 290 (or other location). If no connection attempt is made (block 615=No), the flowchart proceeds back to block 610. Otherwise, if a connection attempt is made (block 615=Yes), in block 620, the electronic device 190 queries the cloud service provider 160 to determine if there is updated connectivity information. In block 430 of FIG. 4, the cloud service provider 160, if a query is received, determines if connectivity information changed and, if changed, send changed connectivity information. There are many techniques possible for performing this. For instance, the electronic device 190 can timestamp the last time active connectivity information was received, and the cloud service provider 160 can timestamp the previous change to the connectivity information. The electronic device 190 could send its timestamp to the cloud service provider 160 and the cloud service provider 160 could determine whether or not to send updated information. Still other options are possible.

If there is updated connectivity information (block 625=Yes), the electronic device 190 receives from the cloud service provider 160 an update for the changed connectivity information for friend X (block 635) and updates the phonebook 290 or another appropriate location (block 645). If there is no updated connectivity information (block 625=No) or the phonebook was updated (block 645), the electronic device 190 attempts to connect to friend X (i.e., mobile device 110) using the current connectivity information.

Referring now to FIG. 7, most of the blocks in this flowchart have been described in reference to FIG. 6, so only the difference are described here. In block 720, the electronic device 190 request and downloads active connectivity information from the cloud service provider 160. In block 435 of FIG. 4, the cloud service provider 160, if a request for current connectivity information is received, sends the active connectivity information to the electronic device 190. In block 725 of FIG. 7, the electronic device 190 determines if there is updated connectivity information, e.g., by comparing the received connectivity information with the connectivity information in the phonebook 290. In FIG. 7, there is no block 635, as the electronic device 190 has already received the active connectivity information in block 720.

Figure 8:
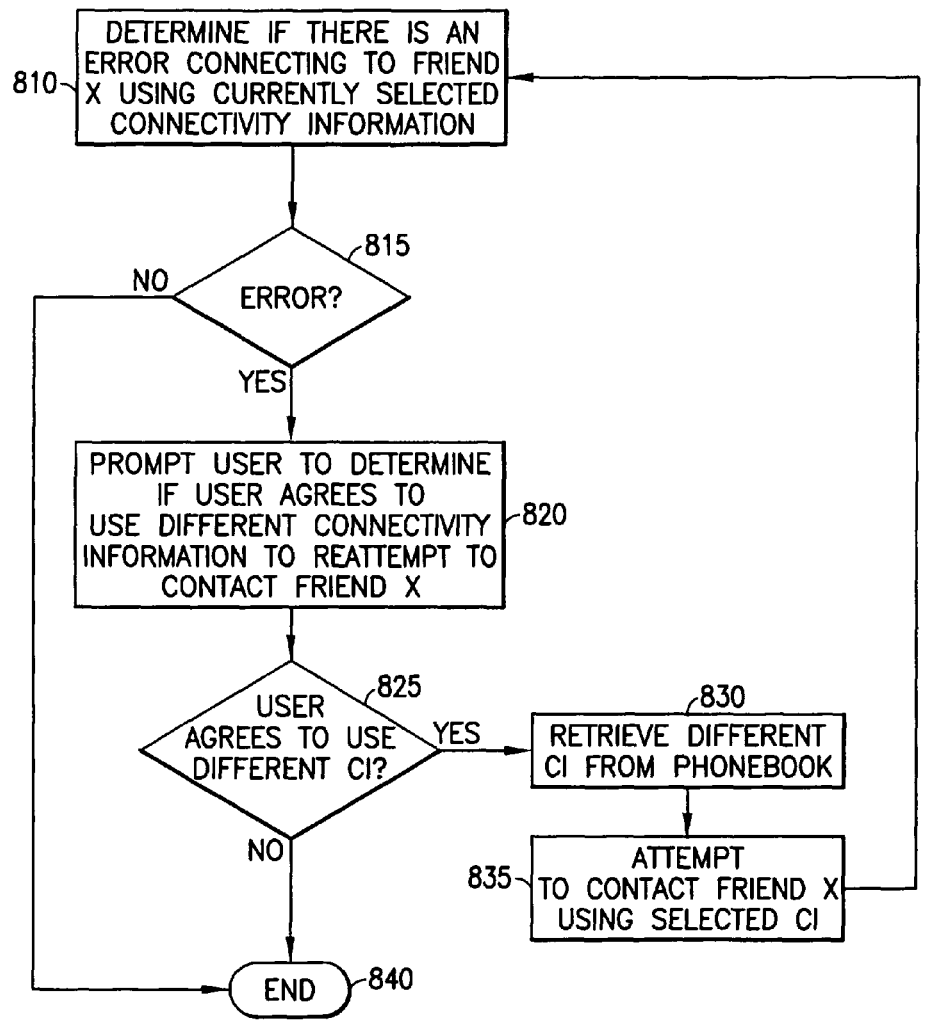
FIG. 8 is a block diagram of a flowchart performed by a device to use other connectivity information instead of the currently active connectivity information to contact friend X.

Turning to FIG. 8, a block diagram is shown of a flowchart performed by a device to use other connectivity information instead of the currently active connectivity information to contact friend X. The blocks in the flowchart may be method operations, operations performed by computer program code (and executed by one or more processors), operations performed in hardware (e.g., an integrated circuit configured to perform the operations), or operations performed by code in a storage medium (and suitable for causing a computer to perform the operations). FIG. 8 allows an electronic device 190 to use connectivity information other than the currently selected active connectivity information, e.g., if there is an error connecting using the active connectivity information. This embodiment assumes multiple entries 240 in the phonebook 290.

Figure 9:
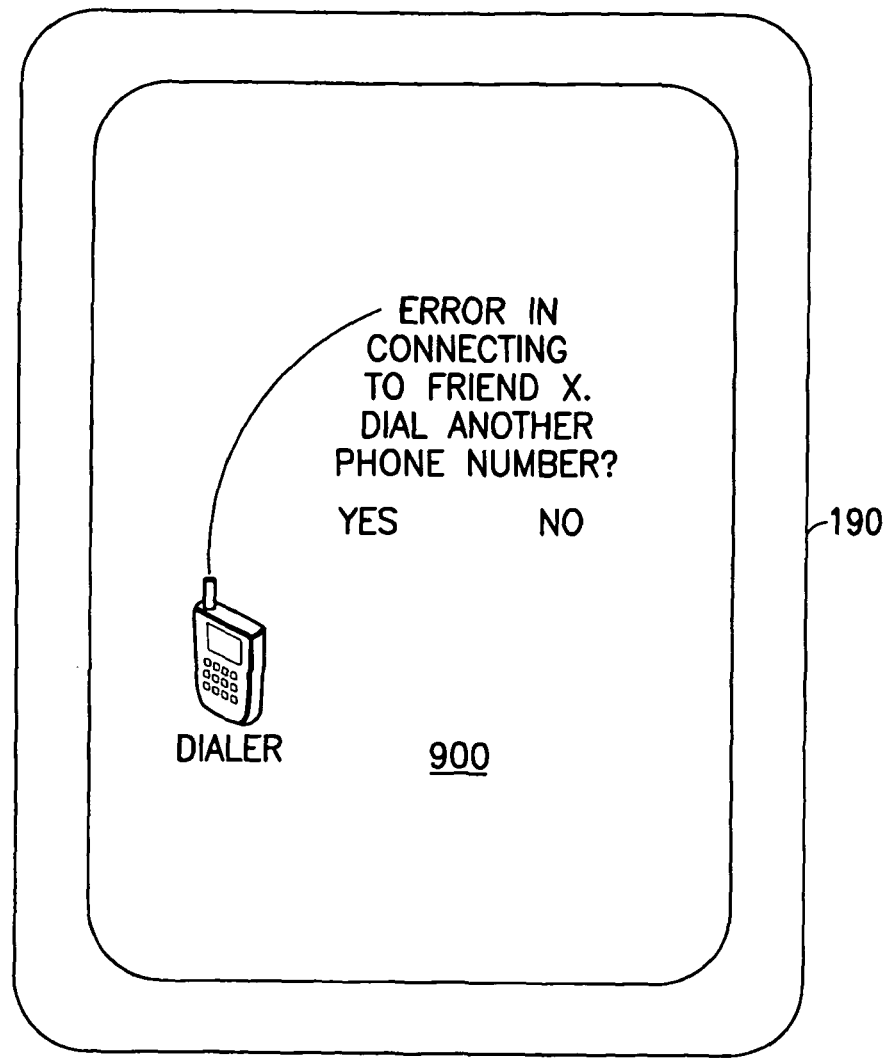
FIG. 9 is an example of an electronic device with a prompt on a touch screen.

In block 810, the electronic device 190 determines if there is an error connecting to friend X using the currently selected connectivity information. The first time block 810 is performed, the currently selected connectivity information is the active connectivity information. If there is no error (block 815=No), the flowchart ends in block 840. If there is an error (block 815=Yes), the electronic device 190 prompts the user to determine if user agrees to use different connectivity information to reattempt to contact friend X. FIG. 9 is an example of an electronic device 190 with a prompt on a touch screen 900. The example of FIG. 9 is for a mobile phone number (e.g., 250 from phonebook 290). The user would select either Yes or No. It is noted that there could be a preconfigured setting that the mobile device (e.g., electronic device 190) performs a connection automatically to a number which was last updated (i.e., rather than displaying the message in FIG. 9).

Based on the response of the user, block 825 will be either Yes (e.g., the user selected Yes in FIG. 9) or No (e.g., the user selected No in FIG. 9). If the user agrees to use different connectivity information (CI) (block 825=Yes), the electronic device 190 retrieves different (e.g., previously active) connectivity information from the phonebook 290 (or other location). In block 835, the electronic device 190 attempts to contact friend X using the selected connectivity information and the flowchart proceeds to block 810. If the user does not agree to use the different connectivity information (block 825=No), the flowchart ends in block 840.

Figure 10:
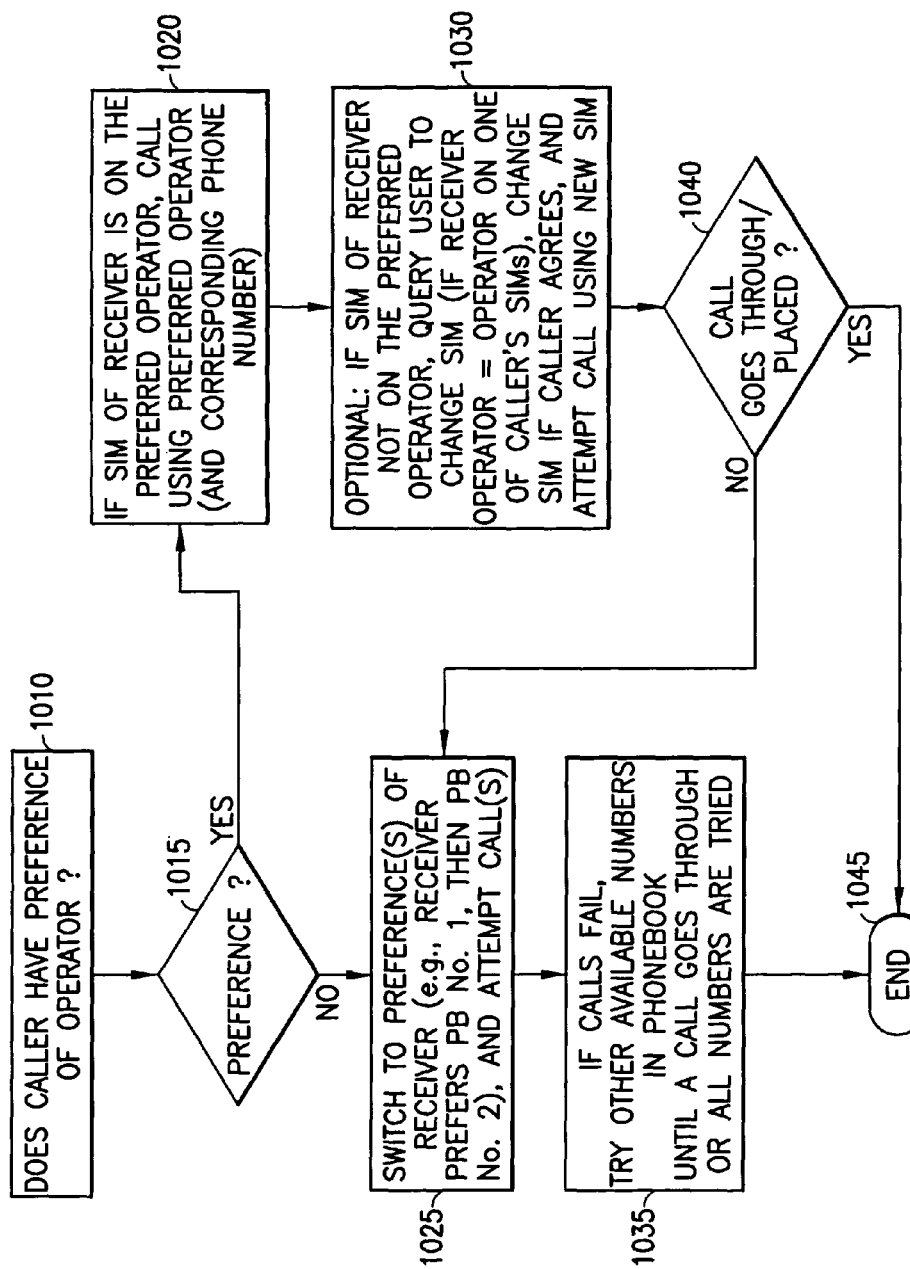
FIG. 10 is an example of a block diagram of a flowchart performed by a device to use preferences for operators for both a user and a user's friend.

Referring now to FIG. 10, is an example of a block diagram of a flowchart performed by a device to use preferences for operators for both a user and a user's friend. As explained above in reference to FIG. 2, preference(s) 293 for the mobile device 110 are preferences of the user of the mobile device 110. Meanwhile, the user of the mobile device 190 may also have a preference 294 of a preferred operator (OP 2). These preferences may adjust the order and possibly override the order in which connectivity information such as phone numbers are used by the mobile device 190 when the mobile device 190 attempts to contact the mobile device 110.

In particular, in FIG. 10, in block 1010, it is determined if the caller has an order of preference of an operator. In the example of FIG. 2, the preference 294 of the caller (i.e., the user of mobile device 190 in this example) is for operator 2 (OP 2). If there is no preference (block 1015=No), the flowchart proceeds to block 1025. If there is a preference (block 1015=Yes), then in block 1020, if the SIM of the receiver (i.e., mobile device 110 in this example) is on the preferred operator, then a call is performed using the preferred operator and a phone number of the mobile device 110 corresponding to the preferred operator. In the example of FIG. 2, the SIM of the receiver is on operator 1 225-1, which is not the preferred operator 294. Therefore, the flowchart would pass to block 1040 (where no call is placed, so the flowchart would proceed to block 1025). However, in an optional example, in block 1030, if the SIM of the receiver not on the preferred operator, the user is queried to change the SIM 138 (see FIG. 2) of the mobile device 190, if the receiver operator is the same as the operator on one of the caller's SIMs. The SIM 138 in the mobile device 190 is changed, if the caller agrees, and an attempted call is made using the new SIM. The flowchart passes to block 1040, where if the call goes through (block 1040=Yes), the flowchart ends in block 1045; otherwise (block 1040=No), the flowchart proceeds to block 1025.

In block 1025, the mobile device 190 switches to preference(s) (e.g., 293) of the receiver. For instance, if the receiver prefers PB No. 1 (phonebook number 1), then PB No. 2, an attempt to call the receiver is made using PB No. 1, and if the call fails, an attempt to call the receiver is made using PB No. 2. If these calls fail, block 1035 is performed, and other numbers in the phonebook are used until a call goes through or all numbers are tried, whereupon the flowchart ends in block 1045.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 171, 195 or other device) that may be any media or means that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is to use a cloud-based in order to allow a user to be contacted after connectivity information has changed due to a change in operators via a SIM change. Another technical effect is to provide a friend of a user with updates of connectivity information. Another exemplary technical effect is to provide a service that received updates in connectivity information from a user and sends the updates to other users subscribed to receive updates for the users.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
  one or more processors; and
  one or more memories including computer program code,
  the one or more memories and the computer program code configured, with the one or more processors, to cause the apparatus to perform at least the following:
    receiving from a service provider an update of changed connectivity information for a first electronic device for which a second electronic device is subscribed at the service provider for updates to connectivity information for the first electronic device, the receiving occurring at the second electronic device, the connectivity information allowing second electronic devices to connect to the first electronic device at least while the first electronic device is wirelessly connected to a network, wherein each of the second electronic devices includes a memory storing a phonebook, wherein the second electronic device is a user equipment having connectivity information of the first electronic device stored in the phonebook of the second electronic devices;

responsive to a determination a caller associated with the second electronic device has a preferred operator, determining if an operator associated with the connectivity information of the first electronic device is a same as the preferred operator; and attempting, at the second electronic device, to contact the first electronic device using at least some of the changed connectivity information, wherein responsive to the operator associated with the connectivity information of the first electronic device being the same as the preferred operator, attempting a call to the first electronic device using a phone number for the preferred operator, and responsive to the operator associated with the connectivity information of the first electronic device not being the same as the preferred operator, attempting a call to the first electronic device using one or more phone numbers determined based on one or more preferences associated with the first electronic device.

2. The apparatus of claim 1, wherein:

the update indicates at least a phonebook number corresponding to a changed subscriber identity module card of the first electronic device and to an operator associated with the changed subscriber identity module card; and attempting to contact further comprises attempting to contact the first electronic device using at least the phonebook number.

3. The apparatus of claim 1, wherein:

the update indicates at least a current mobile Internet protocol address of the first electronic device; and attempting to contact further comprises attempting to contact the first electronic device using at least the current mobile Internet protocol address of the first electronic device.

4. The apparatus of claim 1, wherein:

the one or more memories and the computer program code are further configured, with the one or more processors, to cause the apparatus to perform at least the following: interacting with the service provider to subscribe the user of the second electronic device to changes in connectivity information of a user associated with the first electronic device.

5. The apparatus of claim 1, wherein:

the one or more memories and the computer program code are further configured, with the one or more processors, to cause the apparatus to perform at least the following: prior to attempting to contact the first electronic device using at least some changed connectivity information, interacting with the service provider to download active connectivity information for the first electronic device; and attempting further comprises attempting to contact the first electronic device using at least some of the downloaded active connectivity information.

6. The apparatus of claim 1, wherein:

both changed connectivity information and previously active connectivity information are stored by the second electronic device;

the one or more memories and the computer program code are further configured, with the one or more processors, to cause the apparatus to perform at least the following:

determining an error occurred in response to attempting to contact the first electronic device using at least some of the changed connectivity information;

prompting a user of the second electronic device to determine if the user agrees to attempt to contact the first electronic device using previously active connectivity information; and responsive to the user agreeing to attempt to contact the first electronic device using previously active connectivity information, attempting to contact the first electronic device using previously active connectivity information.

7. The apparatus of claim 1, wherein:

the one or more memories and the computer program code are further configured, with the one or more processors, to cause the apparatus to perform at least the following: prior to receiving, requesting currently active connectivity information; and the receiving and attempting are performed in response to the requesting.

* * * * *